United States Patent [19]

Kikuchi et al.

[11] Patent Number: 4,854,833
[45] Date of Patent: Aug. 8, 1989

[54] ELECTROMAGNETICALLY RECIPROCATING APPARATUS WITH ADJUSTABLE BOUNCE CHAMBER

[75] Inventors: Katsuji Kikuchi; Haruki Nakao; Tamotsu Mori, all of Tokyo, Japan

[73] Assignee: Nitto Kohki Co., Ltd., Tokyo, Japan

[21] Appl. No.: 207,212

[22] Filed: Jun. 16, 1988

[30] Foreign Application Priority Data

Jun. 17, 1987 [JP] Japan .............................. 62-92058[U]

[51] Int. Cl.⁴ ............................................. F04B 17/04
[52] U.S. Cl. ..................................... 417/417; 92/85 R
[58] Field of Search ....................... 417/417, 415, 416; 92/85 R; 123/46 SC

[56] References Cited

U.S. PATENT DOCUMENTS 3,461,806  8/1969  Barthalon ............................... 103/53
3,542,495  11/1970  Barthalon ............................... 417/416

FOREIGN PATENT DOCUMENTS 2041092  9/1980  United Kingdom ................ 417/417

Primary Examiner—Carlton R. Croyle
Assistant Examiner—D. Scheuermann
Attorney, Agent, or Firm—Nixon & Vanderhye

[57] ABSTRACT

An electromagnetically reciprocating apparatus includes a piston assembly which is driven by an electromagnet repeating magnetization and demagnetization and a compression coil spring so as to reciprocate a front and rear pistons of the assembly in a front and rear cylinders. An air hole is formed in the rear cylinder to communicate a sealed inner space partitioned in the cylinder by the rear piston with an atmosphere. A valve is mounted on the air hole to adjust a resonance frequency of the vibration system of the apparatus.

2 Claims, 5 Drawing Sheets

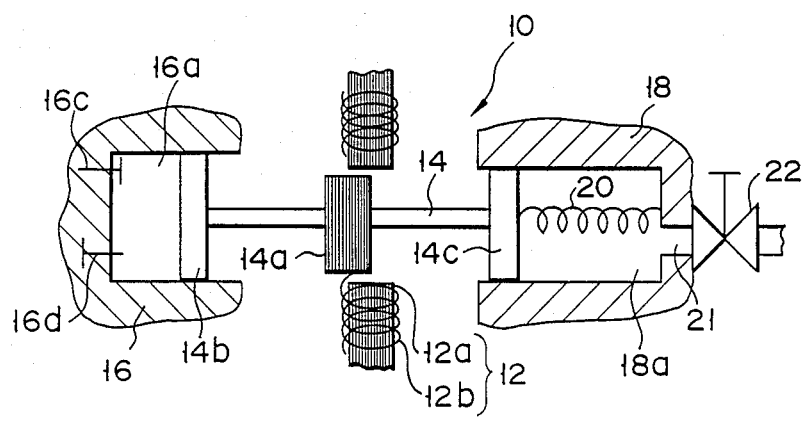
F I G. 2

ABSTRACT# ELECTROMAGNETICALLY RECIPROCATING APPARATUS WITH ADJUSTABLE BOUNCE CHAMBER

BACKGROUND OF THE INVENTION

1. Field of the Invention

The present invention relates to an electromagnetically reciprocating apparatus which is used as, for example a fluid pump.

2. Description of the Related Art

Fundamental construction of one example of a conventional electromagnetically reciprocating apparatus, which is used as a fluid pump (compressor, vacuum pump), is shown in FIG. 1. The conventional apparatus comprises: electromagnet 100, which is consisted of iron core 100a and coil 100b and repeats magnetization and demagnetization for one cycle of AC current; piston assembly 102, which includes magnetic material member 102a to be drawn by magnetized electromagnet 100, and front and rear pistons 102b, 102c disposed before and behind magnetic material member 102; front and rear cylinders 104, 106 for supporting front and rear pistons 102b, 102c of piston assembly 102; and a compression elastic member, in the form of a compression coil spring 108, which is compressed by piston assembly 102 when the latter is moved in a forward direction (movement in a rightward direction in FIG. 1) by magnetic action of electromagnet 100, and which moves piston assembly 102 in a backward direction (movement in a leftward direction in FIG. 1) by elastic force when electromagnet 102 is demagnetized.

In the electromagnetically reciprocating apparatus of this kind, operation efficiency becomes maximum when a vibration system having piston assembly 102 and elastic member (coil spring 108) is reciprocated in a resonance state.

More specifically, piston assembly 102 is reciprocated in the resonance state and an amplitude of reciprocating movement thereof is maximum when the following equation (1) is satisfied. That is, maximum operation efficiency of the electromagnetically reciprocating apparatus can be obtained when $$F = \frac{1}{2\pi} \sqrt{\frac{Ks + Kf}{M}} \quad (1)$$

where

F is the frequency of the commercial electric power source (the number of pulses of DC power source)
M is the mass of piston assembly 102
Kf is the spring constant of a gas sealed in a sealed space 104a formed in front cylinder 104 partitioned by front piston 104
Ks is the spring constant of coil spring 108 compressed by rear piston 102c Then the electromagnetically reciprocating apparatus is used in different areas in which the commercial AC currents have different frequency Fa, Fb (for example, Fa>Fb) the, at first, value of the spring constant (Ks+Kfa) of coil spring 108 and a gas in sealed space 104a, and the mass (M) of piston assembly 102 are set up in order to satisfy the following equation (2) and then make piston assembly 102 reciprocate in maximum amplitude of vibration in the area of frequency Fa:

$$Fa = \frac{1}{2\pi} \sqrt{\frac{Ks + Kfa}{M}} \quad (2)$$

where:
Kfa is the spring constant of a gas in sealed space 104a when the frequency is Fa Then, if the electromagnetically reciprocating apparatus, in which the various values are set as disclosed above, is used in the area of another frequency Fb, the following equation (3) is introduced:

$$Fb > \frac{1}{2\pi} \sqrt{\frac{Ks + Kfb}{M}} \quad (3)$$

where:
Kfb is the spring constant of a gas in sealed space 104a when the frequency is Fb From the equation (3), it becomes clear that piston assembly 102 cannot reciprocate in the resonance state because either the spring constant (Ks+Kfb) is too small or the mass (M) of piston assembly 102 is too big.

Therefore, in Japan, for example, which is divided into two areas where the frequency of the commercial electric power sources is 50 Hz and 60 Hz, respectively, in order to make the conventional apparatus obtain the most preferably resonance state in the different frequency areas, the piston weight and the spring constant of coil spring (the elastic member) 108 are changed. This requires manufacturing of various kinds of vibration systems having resonance frequency which are consistent with various kinds of frequency of the commercial electric power sources, as well as independent storage of various kinds of vibration systems.

SUMMARY OF THE INVENTION

The present invention has been made in consideration of the above situation, and has as its object to provide an electromagnetically reciprocating apparatus which can easily adjust the resonance frequency of a vibration system consisted of the piston assembly and the compression elastic member, etc. without changing the piston weight and the spring constant, and can easily adjust the resonance frequency of the vibration system at a place in which the electromagnetically reciprocating apparatus is used.

The fundamental construction of the electromagnetically reciprocating apparatus 10 of this invention for eliminating the above stated problems is shown in FIG. 2. This electromagnetically reciprocating apparatus 10 comprises: electromagnet 12 which is consisted of iron core 12a and coil 12b and repeats magnetization and demagnetization for one cycle of AC current or for one pulse of DC current; piston assembly 14 which includes magnetic material member 14a to be drawn by magnetized electromagnet 12, and front and rear pistons 14b, 14c disposed before and behind magnetic material member 14a; front and rear cylinders 16, 18 for supporting front and rear pistons 14b, 14c; and a compression elastic member, in the form of a compression coil spring 20, which is compressed by piston assembly 14 when the latter is moved in a forward direction (movement in a rightward direction in FIG. 2) by magnetic action of electromagnet 12, and which moves piston assembly 14 in a backward direction (movement in a leftward direction in FIG. 2) by elastic force when electromagnet 12 is demagnetized. An air hole 21 is mounted on rear cylinder 18 to communicate a sealed space partitioned in rear cylinder 18 by rear piston 14c of piston assembly 14 with the outside of rear cylinder 18, and valve means 22 is mounted on air hole 21 to adjust a resonance frequency of the vibration system having piston assembly 14 and compression coil spring 20.

In fluid working chamber 16a which is disposed in front cylinder 16 so as to be expanded and reduced in volume by the reciprocal movement of piston assembly 14, fluid suction valve 16c for sucking fluid into fluid working chamber 16a in a volume expansion process of fluid working chamber 16a, and fluid exhaust valve 16d for exhausting fluid from fluid working chamber 16a in a volume reduction process are mounted.

In electromagnetically reciprocating apparatus 10 constructed as described above, the adjustment of opening of valve means 22 causes a sympathetic vibration of piston assembly 14 by the different electric power sources having different frequency.

It is preferable that the valve means is formed on an end wall of a housing, the inner space of which communicates with the atmosphere. One end of the air hole is open to the sealed space of the rear cylinder and the other end is open at the outer end face of end wall of housing, and the inner space of the housing is open on the outer end face of end wall of housing at a position near to the other end of the air hole. It is also preferable that the valve means comprises a cap-like valve casing hermetically mounted on the outer end face of end wall of housing so as to cause an end face opening of the inner space of the valve casing to cover the other end of the air hole and the opening of the inner space of the housing; and a valve body arranged in the inner space of the valve casing so as to be movable between a closed position where communicates between the other end of the air hole and the opening of the inner space of the housing through the inner space of the valve casing is interrupted, and an open position where communication between the other end of the air hole and the opening of the inner space of the housing through the inner space of the valve casing is allowed.

The valve means having the structure as described above can be easily assembled in or disassembled from the electromagnetically driven reciprocating apparatus so as to perform repair and inspection.

In the electromagnetically reciprocating apparatus of this invention constructed as described above, it is preferable that the valve body of the valve means is accommodated in the inner space of the valve casing so as to pivot about an axis parallel to the axis of the rear cylinder, and is movable between the open and closed positions upon pivotal movement thereof. The valve body includes an operation pin extending from the inner space of the valve casing in a direction along the axis thereof and exposed on an outer surface of the valve casing.

This valve means is more compact and has better operability.

When the electromagnetically reciprocating apparatus of this invention is constructed as described above, it is preferable that the compression elastic member is a compression coil spring arranged in the rear cylinder. When the compression elastic member is arranged as described above, the electromagnetically reciprocating apparatus can be made more compact.

Therefore, an electromagnetically reciprocating compressor or vacuum pump of this kind, (which can be used in Japan which has two areas in which the frequencies of commercial electric power sources are 50 Hz and 60 Hz), produces a sympathetic vibration of the vibration system by DC current pulse or AC current, having frequency between 50 Hz and 60 Hz, when the following steps (1) to (4) are practiced in the following order.

(1) The weight (M) of piston assembly 14 and the spring constant (Ks) of coil spring 20 are set up to make piston assembly 14 sympathetically vibrate at 50 Hz (specific frequency).

(2) The volume of sealed space 18a in the rear side is set up to make a gas in sealed space 18a with a spring constant (Kr) which produces sympathetic vibration at 60 Hz (desired frequency).

(3) Air hole 21, having an enough opening area so as not to resist the sympathetic vibration at 50 Hz, is mounted on rear cylinder 18.

(4) Valve means 22 is mounted on air hole 21. After execution of the above steps (1) to (4), the vibration system can sympathetically vibrate either at 50 Hz or at 60 Hz by adjusting the opening of valve means 22.

In the electromagnetically reciprocating apparatus of this invention, the resonance frequency of vibration system can be easily adjusted. That is, the movement of piston assembly can be adjusted to make a maximum vibration (resonance frequency state), which is preferable in the usage of the apparatus in the areas having different frequency of AC current, merely by the only adjustment of valve means, without changing of piston weight and the spring constant, to make the resonance frequency of vibration system be inconsistent with the frequency of supplied electric current.

Further, the possibility of adjustment described above produces a very superior technical advantages that a fluid pump of high performance is easily obtained even if the piston weight and the spring contact have a slight variation.

BRIEF DESCRIPTION OF THE DRAWINGS

FIG. 2 is a schematical view showing a fundamental construction of electromagnetically reciprocating apparatus of this invention;

DETAILED DESCRIPTION OF THE PREFERRED EMBODIMENT

Figure 1:
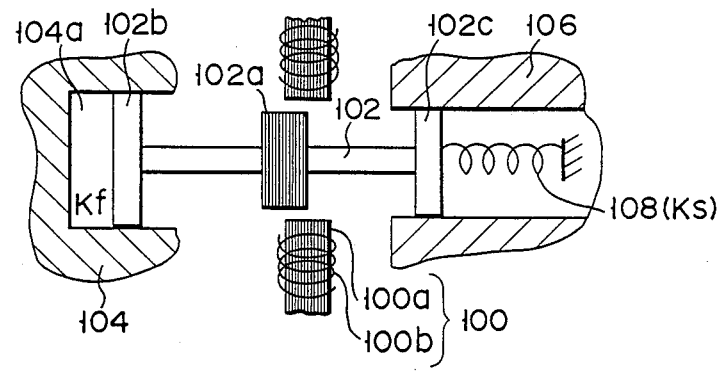
FIG. 1 is a schematical view showing a fundamental construction of conventional electromagnetically reciprocating apparatus.
Figure 3:
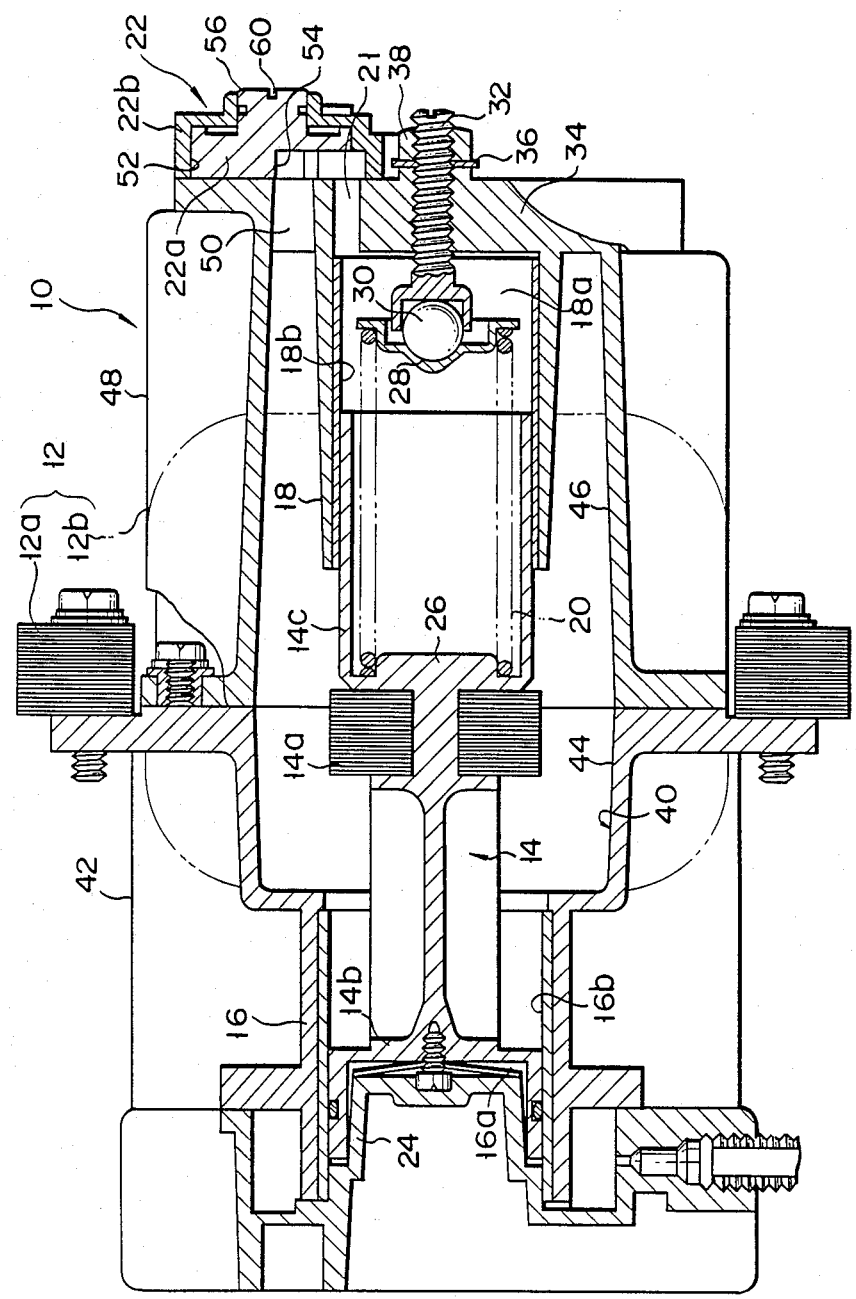
FIG. 3 is a schematic longitudinal sectional view of the electromagnetically reciprocating pump according to an embodiment of the present invention, in which a piston assembly of the pump is located at a top dead center.

In FIG. 3, one embodiment of the electromagnetically reciprocating apparatus according to the inventions is shown. Electromagnetically reciprocating apparatus 10 shown in FIG. 3 comprises: electromagnet 12 which is consisted of iron core 12a and coil 12b and repeats magnetization and demagnetization for one cycle of AC current or for one pulse of DC current; piston assembly 14 which includes magnetic material member 14a to be drawn by magnetized electromagnet 12, and front and rear pistons 14a, 14c disposed before (in the leftward direction in FIG. 3) and behind (in the rightward direction in FIG. 3) magnetic material member 14; front and rear cylinders 16, 18 for supporting front and rear pistons 14b, 14c through cylinder liners 16b, 18b; compression coil spring 20 which is compressed by piston assembly 14 when the latter is drawn by magnetic action of electromagnet 12 to move in forward direction (movement in a rightward direction in FIG. 3) and moves piston assembly 14 in a backward direction (movement in a leftward direction in FIG. 3) by elastic force when electromagnet 12 is demagnetized; front-side fluid working chamber 16a which is formed by front piston 14b, front cylinder 16, and front cover 24, and which repeats expansion and contraction of its volume by the reciprocal movement of piston assembly 14 to press air and to exhaust the pressed air through a fluid exhaust port (not shown); rear-side sealed space 18a which is formed by rear piston 14c and rear cylinder 18, and which repeats contraction and expansion of its volume by the reciprocal movement of piston assembly 14; air opening 21 for communicating rear-side sealed space 18a with an outer space; and valve means 22 for adjusting the degree of air flow between rear-side sealed space 18a and the outer space through air hole 21. Valve body 22a of valve means 22 is guided by valve casing 22b to be pivotable. One end of compression coil spring 20 is supported by a closed end of indented portion 26 formed on the end face of rear piston 14c, and the other end thereof is supported by spring support 28. Spring support 28 is placed on adjustment screw 32 through ball 30, and adjustment screw 32 is threadably engaged in end wall 34 of rear cylinder 18 to adjust compression strength of compression coil spring 20. Lock nut 38 is threadably fitted on the outer-projected end of adjustment screw 32 through washer 36 to lock adjustment screw 32 on end wall 34 of rear cylinder 18.

A housing for the electromagnetically reciprocating apparatus 10 comprise a front housing member 42 with stepped aperture 40, and rear housing member 48 with aperture 46 having the same diameter as that of large-diameter portion 44 of stepped aperture 40 of front housing member 42. Rear housing member 48 is coaxially fixed to front housing member 42 such that aperture 46 is adjacent to large-diameter portion 44 of stepped aperture 40 of front housing member 42.

A small-diameter portion of stepped aperture 40 serves as front cylinder 16 for front piston 14b. The end portion of front cylinder 16, which is remote from large-diameter portion 44, is closed by cylinder head member 24 fixed to front housing member 42. A fluid suction valve 16c and fluid exhaust valve 16d both of which are shown in FIG. 2 are mounted on cylinder head member 24. Aperture 46 of rear housing member 48 is opened to atmospheric air through an opening (not shown).

Cylindrical rear cylinder 18 is formed on the end wall of rear housing member 48 so as to be coaxial to the axis of aperture 46 of rear housing member 48. The end wall of rear housing member 48 thus comprises end wall 34 of rear cylinder.

Air hole 21 is formed in end wall 34 of rear housing member 48. One end of air hole 21 is open to rear-side sealed space 18a defined between the end face of rear piston 14c and end wall 34 of rear housing member 48, and the other end of which is open on the outer end face of end wall 34. Second air hole 50 is also formed in end wall 34. One end of second air hole 50 is open to the inner space of rear housing member 48 in the radially outward portion of rear cylinder 18. The other end of second air hole 50 is open on the outer end face of end wall 34 at a position near the other end of first air hole 21.

Valve means 22 is formed on the outer end face of end wall 34 to control a flow rate of a fluid between rear-side sealed space 18a of rear cylinder 18 and an inner space (this inner space is communicated with atmospheric air through the above-mentioned opening (not shown)) of rear housing member 48 through first and second air holes 21 and 50.

Figure 7:
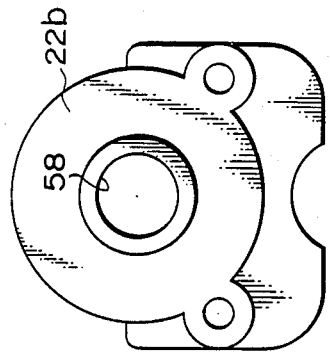
FIGS. 5, 6, and 7 are a front view, a longitudinal sectional view, and a rear view, respectively, of a valve casing of valve means mounted on the pump.
Figure 6:
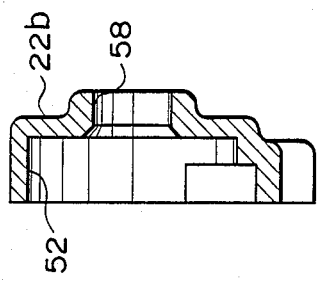
Figure 5:
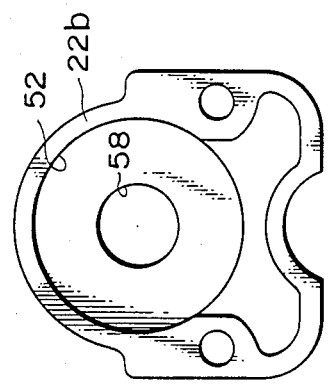
Figure 10:
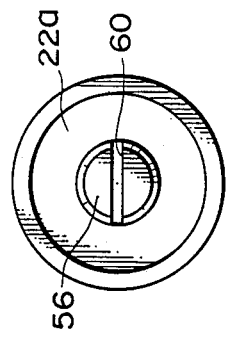
FIGS. 8, 9, and 10 are a front view, a longitudinal sectional view, and a rear view, respectively, of a valve body of the valve means mounted on the pump.
Figure 9:
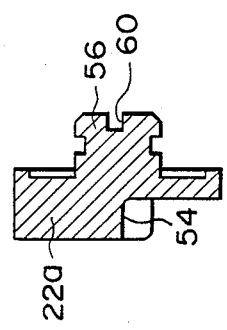
Figure 8:
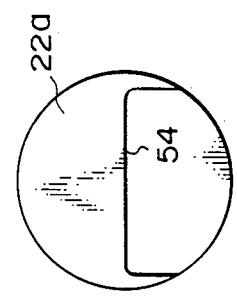
Figure 12:
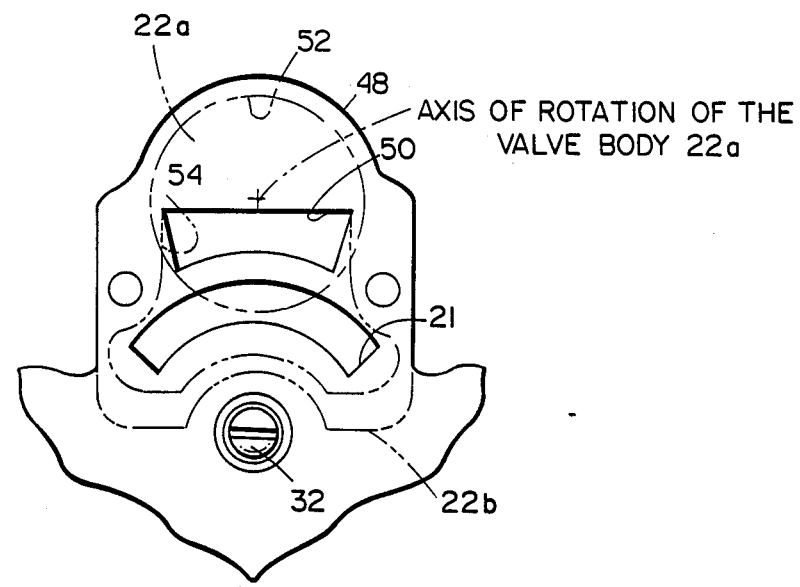
FIGS. 11 and 12 are partial plan views of the apparatus shown in FIGS. 3 and 4 illustrating the relationship between air holes provided in the end wall of the apparatus and the valve means shown in FIG. 9.
Figure 11:
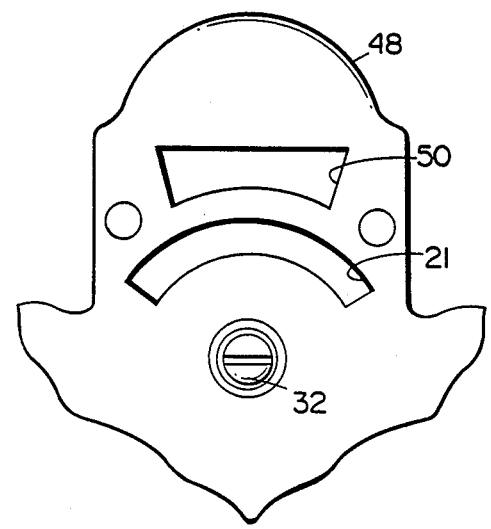

Valve casing 22b of valve means 22 is formed to have a cap-shape which is detachably and hermetically fixed to the outer end face of end wall 34 so as to cover both the openings of first and second air holes 21 and 50 at the outer end face of end wall 34. Disc-like valve body reception recess 52, as best shown in FIGS. 5 and 6, is formed in the inner space of valve casing 22b opposing, as shown in FIG. 3, both the openings of first and second air holes 21 and 50 at the outer end face of end wall 34. Valve body 22a having a substantially disc-like shape, as best shown in FIGS. 8 to 10, is fitted in recess 52, as shown in FIG. 3. Fluid flow recess 54 is formed in the lower half on one end face of valve body 22a. Operation pin 56 extending in an axial direction of valve body 22a is integrally formed on the central portion of the other end face of valve body 22a. Operation pin 56 is inserted in through hole 58 (best shown in FIGS. 5 to 7) formed at the center of the bottom surface of recess 52 of valve casing 22b and is exposed outside valve casing 22b. As shown in FIGS. 9 and 10, slot 60 is formed on the exposed end of operation pin 56 so as to receive a screwdriver (not shown).

When the screwdriver (not shown) is rotated in one or the other direction after the tip of the screwdriver is engaged with slot 60, valve body 22a is rotated in valve body reception recess 52 of valve casing 22b in one or the other direction. Upon rotation, valve body 22a can move between an open postion where fluid flow recess 54 corresponds to first and second air holes 21 and 50 shown in FIG. 3, and a closed position where an upper half (FIG. 8), on which fluid path recess 54 is not formed, on the one end face of valve body 22a corresponds to the first and second air holes 21 and 50.

When valve body 22a is located in the open position, as shown in FIG. 3, rear-side sealed space 18a of rear cylinder 18 communicates with an inner space (this space is communicated with atmospheric air through the above-mentioned opening (not shown)) of rear housing member 18 through first and second air holes 21 and 50. However, when valve body 22a is located at the closed position, communication between rear-side sealed space 18a of rear cylinder 18 and the inner space (this inner space is communicated with atmospheric air through the above-mentioned opening (not shown)) of rear housing member 18 through first and second air holes 21 and 50 is inhibited.

Therefor, when apparatus 10 is used in an area in which the frequency of commercial electric power source is 50 Hz, at first, valve body 22a is disposed at the open position to make first air hole 21 open, and then half-wave rectified AC current or DC current pulses are supplied to apparatus 10 to drive it. And, when apparatus 10 is used in an area in which the frequency of commercial electric power source is 60 Hz, at first, valve body 22a is disposed at the closed position to make first air hole 21 close, and then above described AC or DC current is supplied to apparatus 10.

Figure 4:
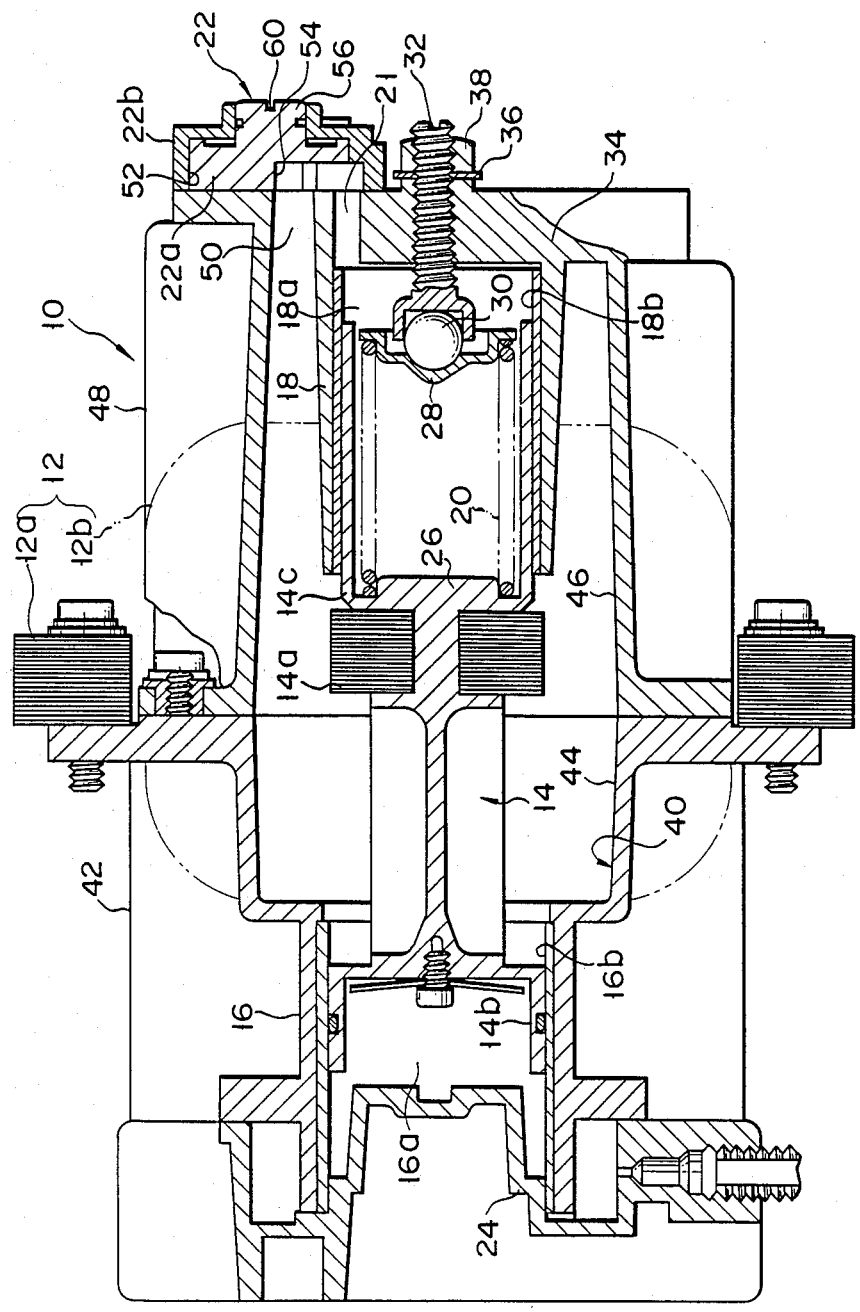
FIG. 4 is a schematic longitudinal sectional view of the electromagnetically reciprocating pump shown in FIG. 3, wherein the piston assembly is located at a bottom dead center.

When electromagnet 12 is energized, magnetic material member 14a is drawn in the rightward direction in FIG. 3 to move piston assembly 14 in the forward direction (movement in the rightward direction in FIG. 3), thereby coil spring 20 is compressed, as shown in FIG. 4. At the same time, the volume of fluid working chamber 16a of front cylinder 16 is expanded, and fluid suction valve 16c shown in FIG. 2 is opened to suck air into fluid working chamber 16a.

Then, when electromagnet 12 is deenergized, piston assembly 14 is moved in the backward direction (movement in the leftward direction in FIG. 4) by elastic force of coil spring 20. At this time, the volume of fluid working chamber 16a is decreased while air in fluid working chamber 16a is compressed. When pressure of air in fluid working chamber 16a reaches a predetermined value, fluid exhaust valve 16d shown in FIG. 2 is opened to exhaust pressurized air in fluid working chamber 16a.

As described above, owing to repetition of magnetization and demagnetization in electromagnet 12, pressurized fluid is supplied to an air consuming source connected to the fluid exhaust port (not shown) in which fluid exhaust valve 16d is mounted or air is sucked from a pressure reduction system connected to the fluid suction port (not shown) in which fluid suction valve 16c is mounted.

Even if this electromagnetically driven reciprocating fluid pump is used in different areas in which frequency of commercial electric power sources are different from each other, the pump can reciprocates piston assembly 14 with maximum amplitude (in the sympathetic vibration state) in every area by adjusting degree of opening of valve member 22a which is mounted to correspond to rear-side sealed space 18a of rear cylinder 18.

In the above described explanation, electromagnetically reciprocating apparatus 10 is used in the two areas in which frequency of commercial AC electric power sources are 50 Hz and 60 Hz. However, apparatus 10 may be used in the other areas, in which frequency of commercial AC electric power source is between 50 Hz and 60 Hz, by stepless regulation of valve body 22a to adjust the opening of first air hole 21.

What is claimed is:

1. An electromagnetically reciprocating apparatus comprising:

an electromagnet which repeats magnetization and demagnetization for one-half cycle of AC current or for one pulse of DC current;

a piston assembly which includes a magnetic material member to be drawn by the electromagnet in a magnetized state, and front and rear pistons disposed before and behind the magnetic material member;

front and rear cylinders for supporting the front and rear pistons of the piston assembly wherein the rear cylinder is formed in a housing the inner space of which communicates with the atmosphere;

a compression coil spring which is compressed by the piston assembly when said piston assembly is moved in a forward direction by the magnetic action of the magnetized electromagnet, and which moves the piston assembly in a backward direction by a compressed elastic force thereof when the electromagnet is demagnetized;

wherein an air hole is provided between a sealed space which is partitioned by a back face off the rear piston in the rear cylinder, and a space which is located behind a back face of the front piston in the front cylinder and is communicated with the outside of the cylinder, the air hole being open at its one side to the sealed space in the rear cylinder in which the compression coil spring is mounted, and being open at its other side to the outer periphery of the rear cylinder and to the inner space of the housing formed in the back face of the front piston in the front cylinder;

manually controlled valve means mounted over the air hole for adjusting resonance frequency of a vibration system comprising the piston assembly and the compression coil spring;

wherein the valve means comprises: a cap-like valve casing hermetically mounted on the outer end face of an end wall of the housing so as to cause an end face opening of the inner space of the valve casing to cover one side of the air hole, which is located in the rear cylinder side, and the other side of the air hole, which is located in the inner space side of the housing; and a valve body arranged in the inner space of the valve casing so as to be movable between a closed position where communication between one side of the air hole and the other side of the inner space of the housing through the inner space of the valve casing is interrupted, and an open position where communication between one side and the other side of the air hole through the inner space of the valve casing is permitted.

2. An electromagnetically reciprocating apparatus according to claim 1, wherein the valve body of the valve means is accommodated in the inner space of the valve casing so as to pivot about an axis parallel to the axis of the rear cylinder and is movable between the open and closed positions upon pivotal movement thereof, and the valve body includes an operation pin extending from the inner space of the valve casing in a direction along the axis thereof and exposed on an outer surface of the valve casing.

* * * * *